United States Patent
Foster

(10) Patent No.: US 7,708,292 B2
(45) Date of Patent: May 4, 2010

(54) INDEPENDENT FOUR WHEEL VIBRATION DAMPING SYSTEM FOR RIDING MOWERS

(75) Inventor: Robert Foster, Batesville, AR (US)

(73) Assignee: Bad Boy, Inc., Batesville, AR (US)

( * ) Notice: Subject to any disclaimer, the term of this patent is extended or adjusted under 35 U.S.C. 154(b) by 161 days.

(21) Appl. No.: 11/881,752

(22) Filed: Jul. 30, 2007

(65) Prior Publication Data

US 2009/0033054 A1 Feb. 5, 2009

(51) Int. Cl.
*B60G 9/02* (2006.01)
(52) U.S. Cl. .............................................. 280/124.117
(58) Field of Classification Search ................ 56/14.7, 56/15.8, 14.8; 280/124.117, 124.128, 124.136, 280/124.151, 124.157
See application file for complete search history.

(56) References Cited

U.S. PATENT DOCUMENTS

| | | | | |
|---|---|---|---|---|
| 2,346,319 A | * | 4/1944 | Mitchell | 301/133 |
| 3,025,079 A | * | 3/1962 | Gouirand | 280/124.151 |
| 4,310,171 A | * | 1/1982 | Merkle | 280/86.75 |
| 4,486,030 A | * | 12/1984 | Takata et al. | 280/124.107 |
| 4,690,427 A | * | 9/1987 | Raidel, Sr. | 280/124.118 |
| 6,357,077 B1 | * | 3/2002 | Jones et al. | 16/44 |
| 6,857,254 B2 | * | 2/2005 | Melone et al. | 56/15.8 |

* cited by examiner

*Primary Examiner*—Paul N Dickson
*Assistant Examiner*—Robert A Coker
(74) *Attorney, Agent, or Firm*—Keisling & Pieper PLC; Trent C. Keisling

(57) ABSTRACT

In a riding mower having a frame, a mower deck supported beneath the frame, a chair on said frame and a source of motive power also supported on said frame. The frame is supported on forward and rear wheel assemblies, and the wheel assemblies each have a supporting wheel, each wheel assembly having a vibration damping system interposed between the frame and each wheel assembly. The vibration damping system comprising at least one pillow interposed between the frame and each wheel assembly and each pillow being of a resilient material for absorbing shock and vibration resulting from a wheel contacting irregularities in the terrain traversed thereby.

5 Claims, 4 Drawing Sheets

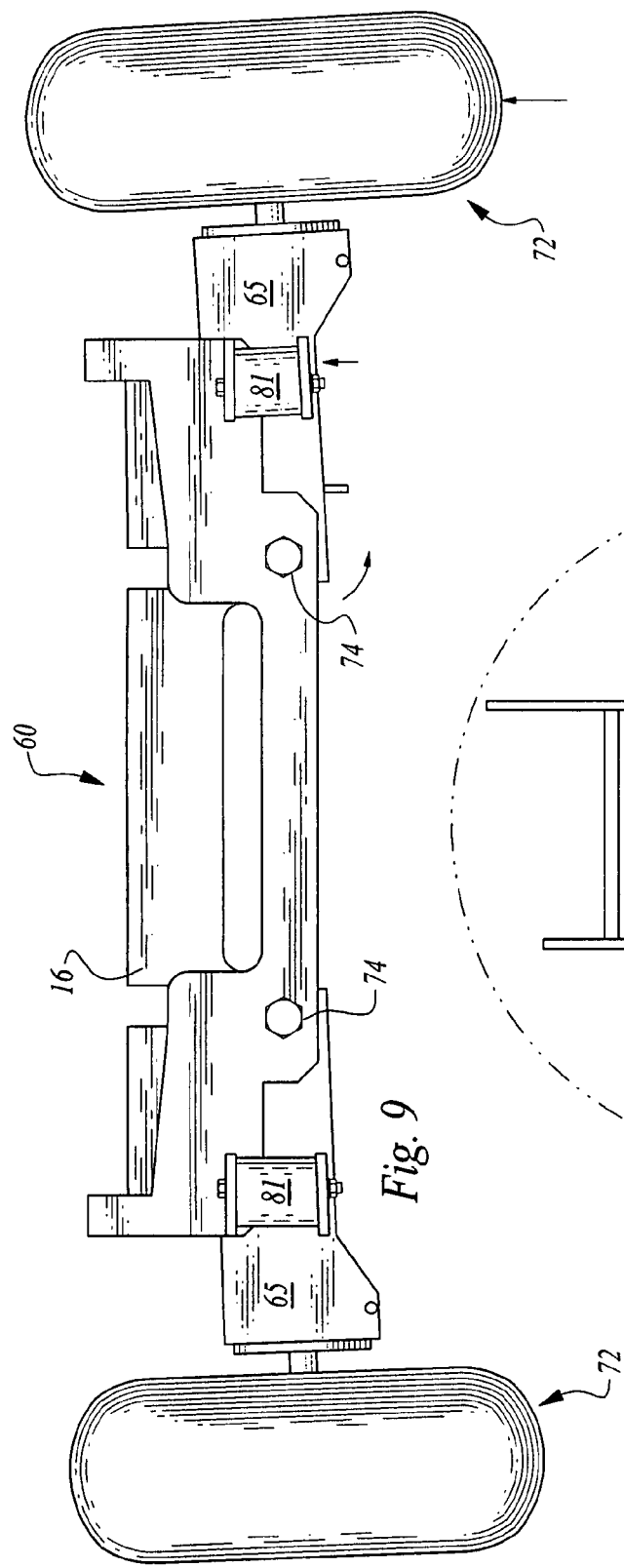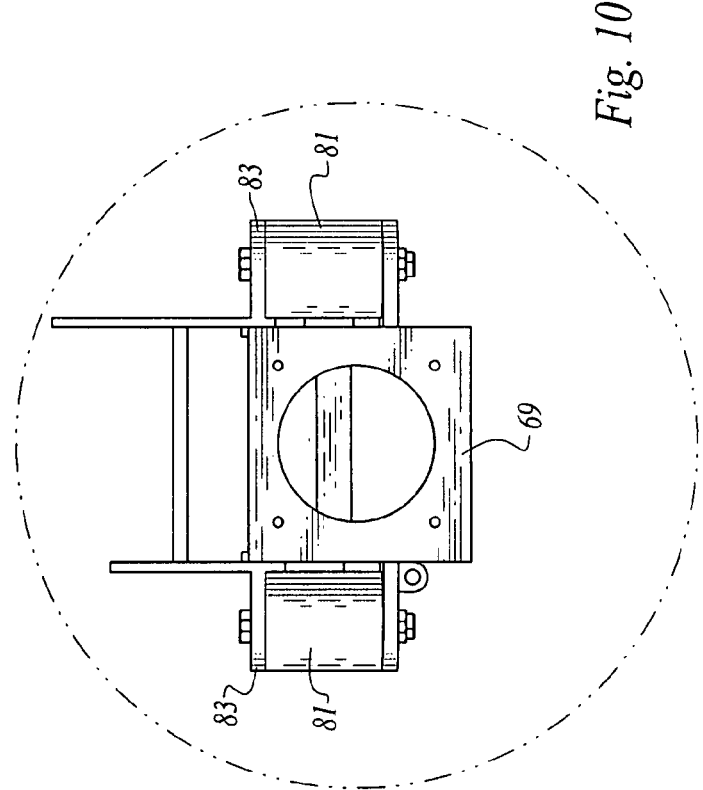

INDEPENDENT FOUR WHEEL VIBRATION DAMPING SYSTEM FOR RIDING MOWERS

BACKGROUND OF THE INVENTION

1. Field of the Invention

The present invention relates generally to riding mowers and, more particularly, to an improved suspension system for such mowers.

Riding mowers have been a staple for maintaining highway rights of way for many years. They are seen moving along grassy center dividers and along the sides of roads in rough, sometimes rocky terrain, and in all sorts of attitudes from flat and level to severe side hills.

In many instances, an operator may be in the seat for hours, and even with a kidney belt, will suffer considerable discomfort and, in some cases, injury. Indeed, it is not inconceivable that the constant bouncing and jarring could cause an operator to lose control, resulting in damage to himself and others.

The underlying purpose and function of the present invention is to provide an element of relief to an operator and, coincidently, increased control.

2. Overview of the Prior Art

The typical riding mower in use today has its wheels affixed directly to the frame of the mower. In the late '90s the self proclaimed leader in the field, David Ferris, and others filed an application for a suspension system for riding mowers. The application claims priority based on provisionals, at least one of which dates back to 1996, and was divided and one of those continuations-in-part issued as Ferris et al. U.S. Pat. No. 6,460,318. The patent features a four bar mechanism relatively common in automotive suspensions. Another part of the original application is believed to be still pending.

Gordon U.S. Pat. No. 6,170,242 is yet another patent assigned to Ferris Industries and claims priority under a 1997 provisional, which is also claimed under the earlier mentioned Ferris et al. patent. Gordon, like Ferris et al., features a four bar mechanism.

A very early patent featuring a rubber bumper between two elements in an automotive structure is found in Hickman U.S. Pat. No. 3,737,174.

Several other patents offer variations on the same theme. See, for example, Dunlap et al. U.S. Pat. No. 3,669,467, which has additional buffering devices, such as springs, leaf or coil, and shock absorbing devices. Dunlap has a pair of cushions, but also uses a pair of rods 32 and 34, which attach directly to the frame rail.

Krakowiak et al. U.S. Pat. No. 5,979,920, uses the simple bumper between the frame rail and a leaf spring. This is a device which is common on many of the earlier motor vehicles.

Merkle U.S. Pat. No. 4,310,717, uses what he refers to as an elastomeric spring, again, between the frame rail and what he refers to as a web section which holds the axle upon which the wheel is connected. It appears in the drawing that there may be a shock absorber in the middle of this assembly.

Bonzer et al. U.S. Pat. No. 4,559,669, employs a resilient buffer 19 for a caster assembly. Heitzman U.S. Pat. No. 5,899,470 uses a couple of resilient buffers as part of a system for adjusting camber and caster. It is evident from these patents that using an elastomeric as a spring or shock absorber is not new in the art. All of these references seek, to a greater or lesser extent, some modulation of the amplitude and frequency of shock transmitted through a wheel of a vehicle, but are unsuited for a riding mower.

SUMMARY OF THE INVENTION

The present invention provides, to the user of a riding mower, a vibration damping system interposed between the supporting wheels and the frame, which significantly reduces shock and vibration incident to the movement of the mower over rocks, twigs and incidental debris, especially on uneven terrain.

Another objective, consonant with the foregoing, is to enhance control and stability in the operation of a riding mower, thereby enhancing the quality of the work performed. Yet another objective is to minimize the fatigue and discomfort that may be experienced by the operator of a riding mower as he or she traverses uneven terrain littered with debris.

The foregoing, as well as other objects and advantages, will occur to those skilled in the art as the following detailed description is reviewed in connection with the accompanying drawings, wherein.

DESCRIPTION OF THE DRAWINGS

FIG. 9 is a side elevation of the rear axle assembly with vibration damping system affixed; and, FIG. 10 is an enlarged partial side elevation of one side of the rear vibration damping system, with the wheel removed to reveal certain details of the system.

DETAILED DESCRIPTION OF A PREFERRED EMBODIMENT

Figure 1:
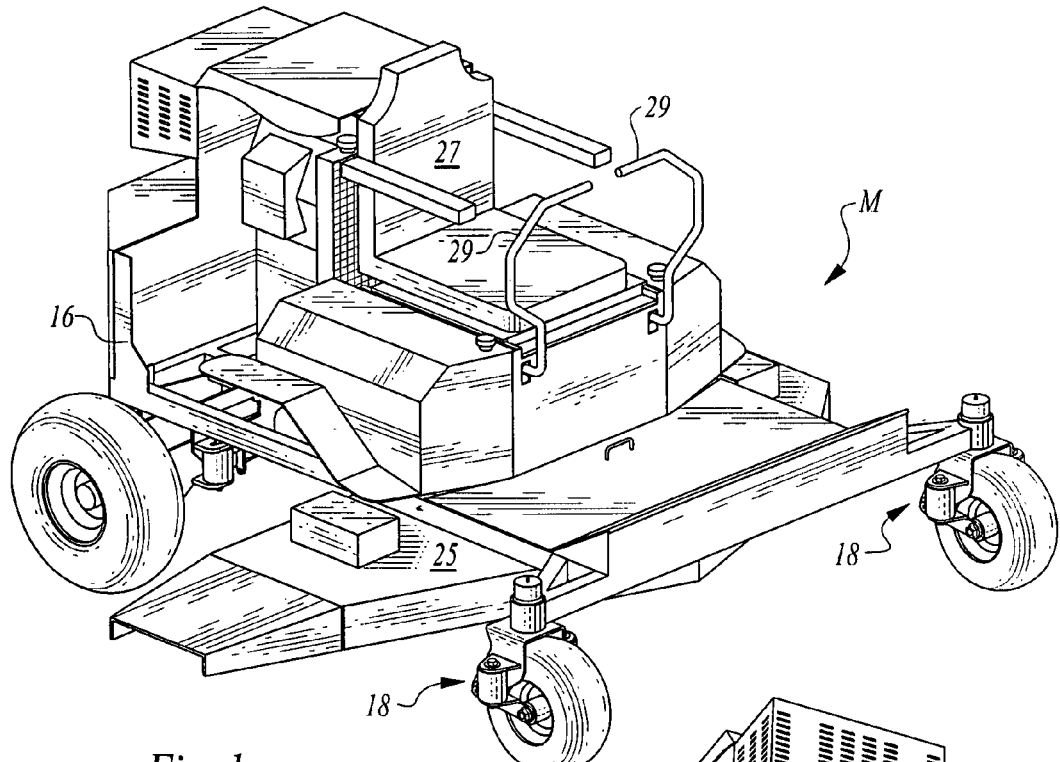
FIG. 1 is a perspective view of a typical riding mower having been enhanced by the addition of the vibration damping system of the present invention, as seen from above.
Figure 2:
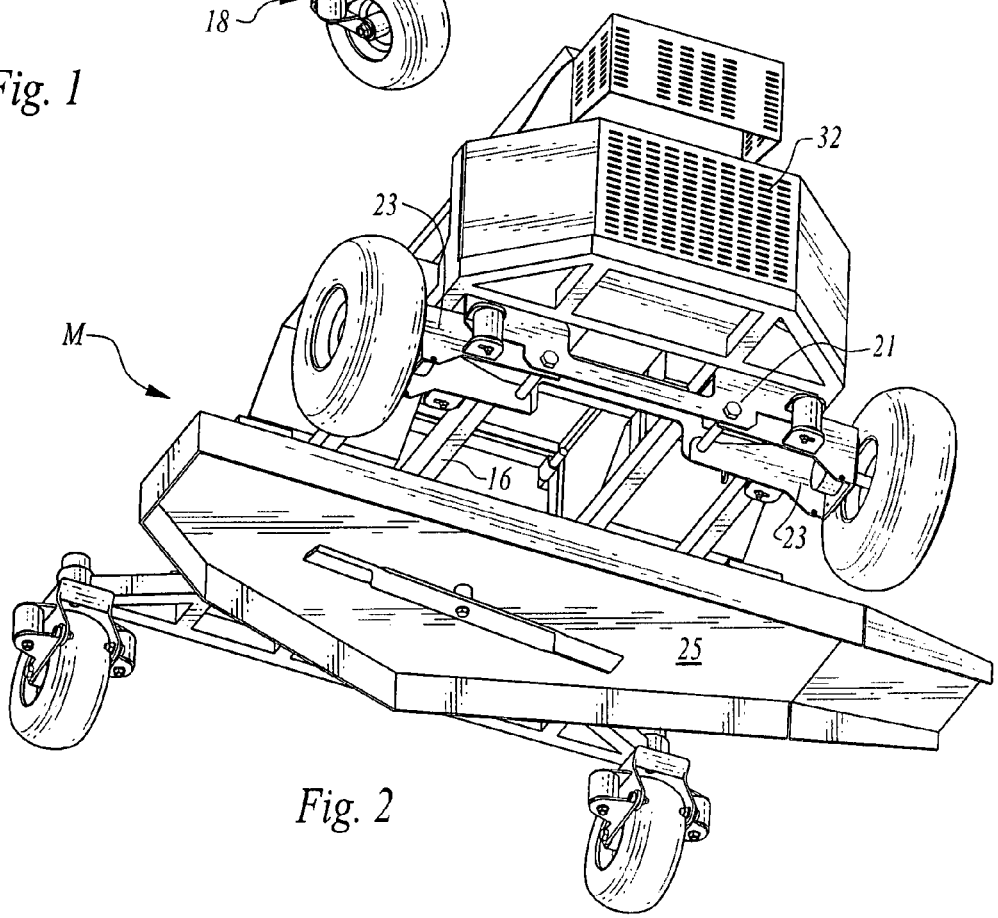
FIG. 2 is a view similar to that of FIG. 1 of the riding mower thereof, but viewed from beneath the mower.

With reference now to the drawings, and initially to FIGS. 1 and 2, a riding mower M, is illustrated. The mower M has a frame 16 supported by a pair of forward wheel assemblies 18 and a rear axle assembly 21 having rear wheel assemblies 23.

The frame 16 supports a mower deck 25, and a chair 27 is provided for a driver, with a pair of steering arms 29 within easy reach. A motor compartment 32 rides on the frame and provides motive power to the mower.

The essence of the present invention is the provision of the mower M which has enhanced comfort and less fatigue for the driver, all of which increases the ability of the driver to control the mower, even in unusual attitudes resulting from irregularities in the terrain, and over extended periods of operation, and particularly where terrain changes are abrupt. In accomplishing its objectives, both forward and rear systems of vibration control are interposed between each of the supporting wheel assemblies and the frame of the mower.

Figure 3:
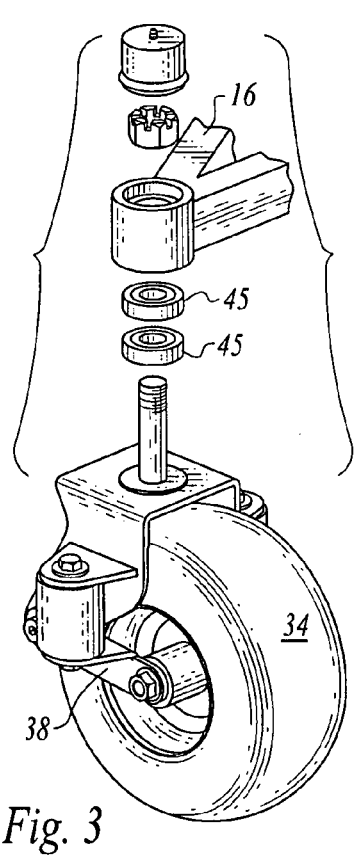
FIG. 3 is an exploded view of a forward wheel assembly illustrating the assembly of the wheel to the frame.
Figure 4:
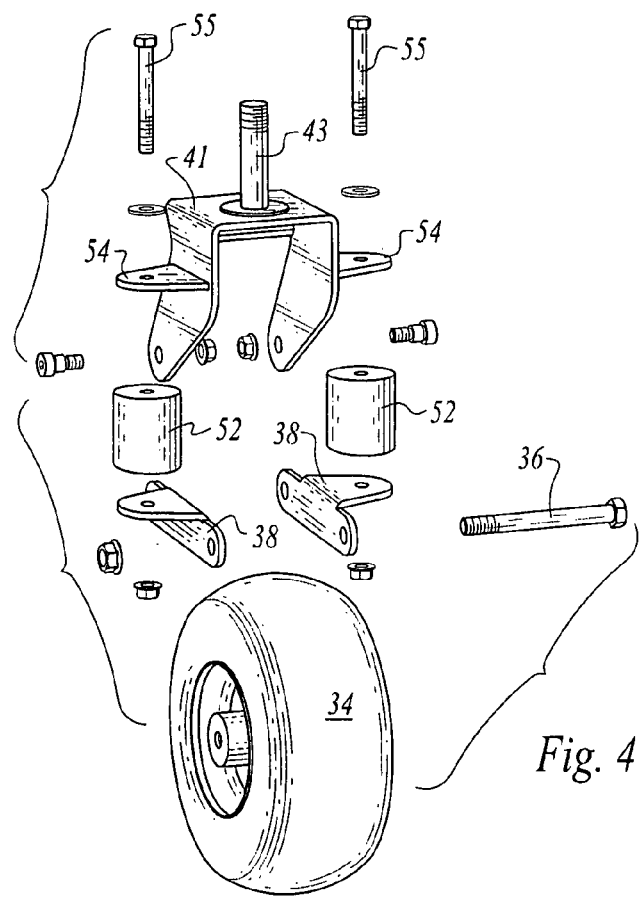
FIG. 4 is an exploded view of the vibration damping apparatus which supports the forward wheel assembly.
Figure 5:
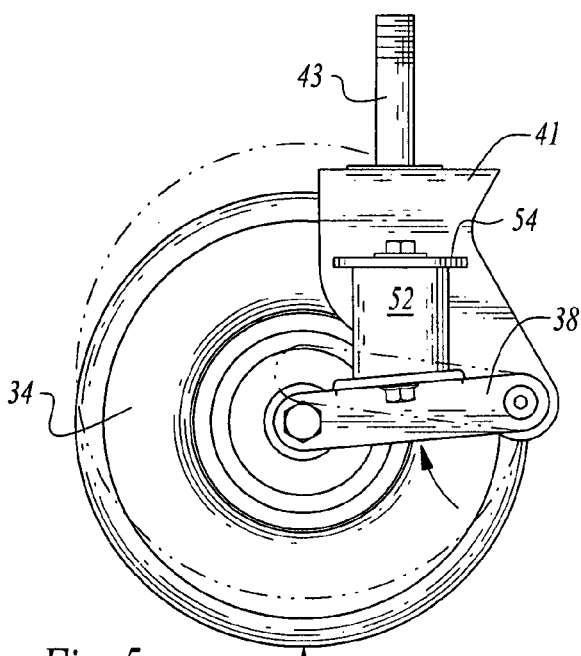
FIG. 5 is a side elevation of the forward wheel fully assembled.
Figure 6:
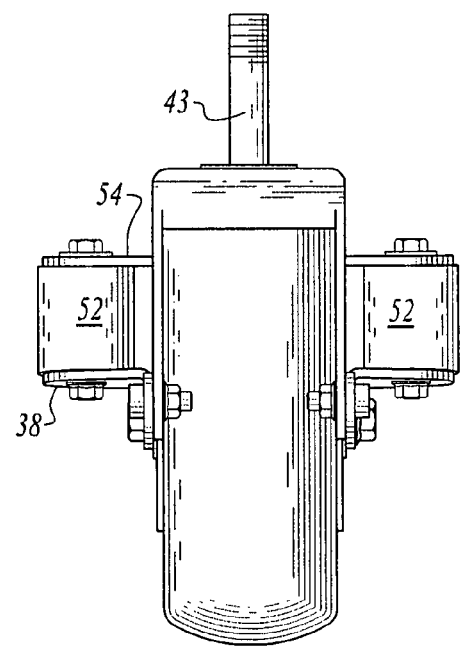
FIG. 6 is an end view of the wheel assembly of FIG. 5.

Referring first to the forward system, the forward wheel assembly 18 is broken down into its various components in FIGS. 3 and 4. Each wheel assembly includes, as a primary element, the wheel 34. An axle 36 is supported by axle brackets 38. The axle 36 is secured in a forward aperture in the axle bracket so that, once assembled, the wheel will caster. A "U" bracket 41 is provided with a vertical post 43 which is mounted in the frame 16 with bearings 47 nested in a recess in the frame. This assembly permits the wheel to rotate freely about the post. The post 43 is held in place by means of a nut 45, and a grease cap 49 is provided over the nut and a grease zerk provides access to the bearings for grease.

A key to the effectiveness of the forward system is a pair of resilient pillows 52 which are interposed between the axle brackets 38 and the "U" bracket 41. The pillows are strategically positioned on either side of the wheel 32 and, for that purpose, flanges 54 extend outwardly from the "U" bracket. Apertures in the "U" bracket and axle brackets align upon assembly and bolts pass through the apertures to secure the pillows in the proper position to absorb vibration in the wheels due to potholes, debris, tree roots, rocks and stones in the path of the wheels. The bolts are secured above and below the pillow and thus limit downward movement of the wheel to which it is related.

Each pillow is resilient and may be of any one of several durometers of rubber hardness, or may be of other suitable elastomeric materials, including elastic shells with a liquid or other compressible material there within, appropriate to the weight of the mower and the terrain to be traversed. The pillows define a cushion between the wheel and the frame of the mower, thereby absorbing shock created by the wheel moving over the uneven terrain. Further, each wheel functions independently, i.e., independent of the frame, in order that it may respond independently to variations in the terrain met by each individual wheel, which may be several feet removed from its companion wheel.

Figure 7:
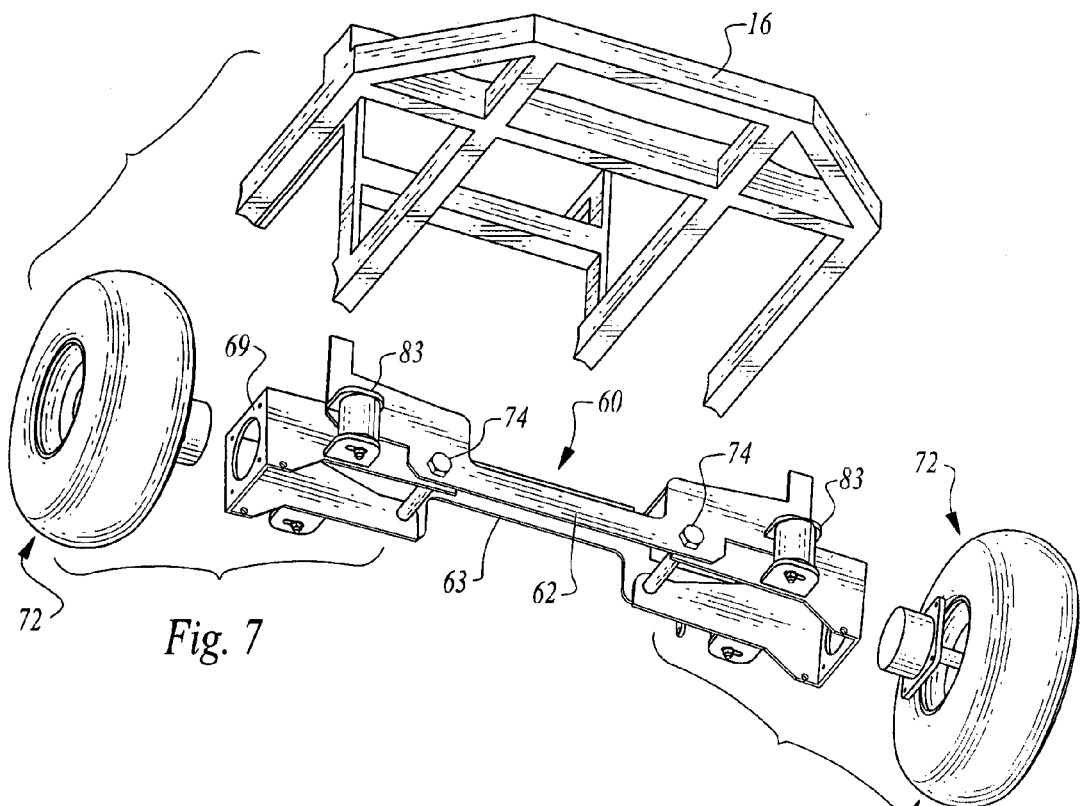
FIG. 7 is a perspective view of the rear axle assembly of the riding mower of FIG. 1, providing a detailed view of the vibration damper assembly of that mower and a partial view of the frame to which it is attached.
Figure 8:
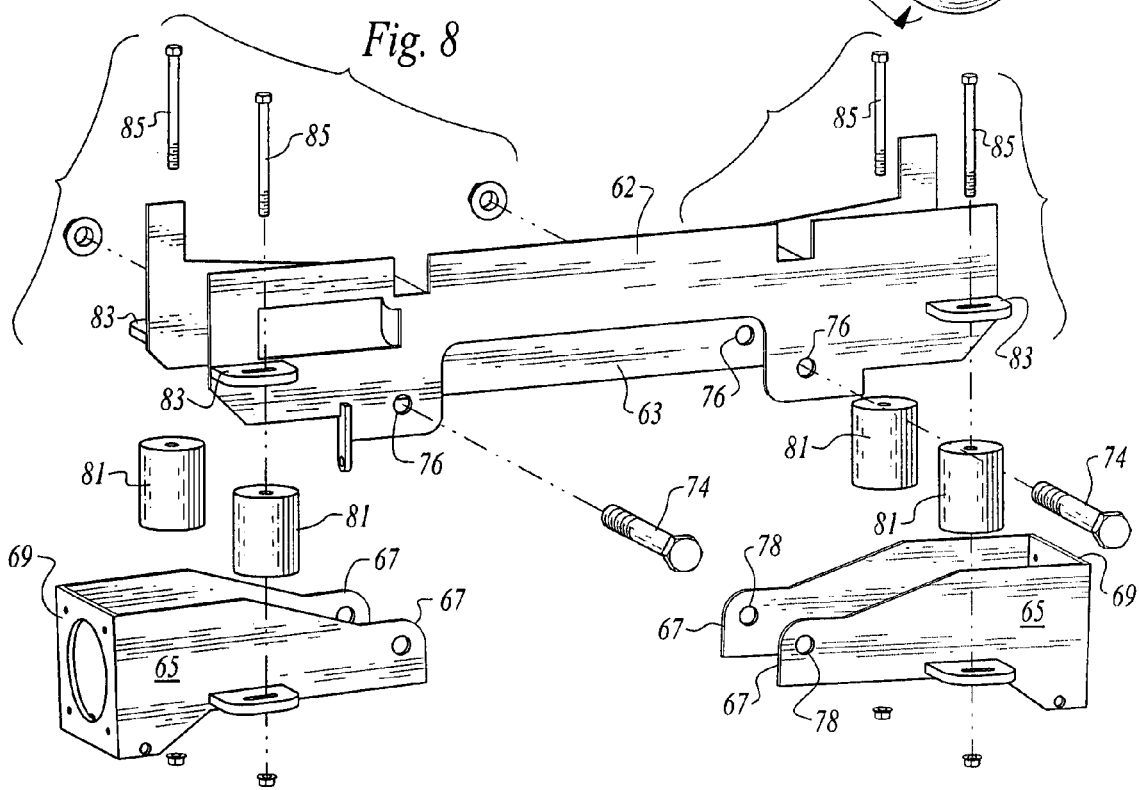
FIG. 8 is an exploded view of the vibration damper assembly as it is integrated into the rear axle of the mower of FIG. 1, and providing detail thereof.

It is a further feature of the present invention that a rear suspension system is provided with vibration damping capability. Referring to FIGS. 7 and 8, the rear segment of the frame 16 supports a rear axle housing 60 which is mounted transverse to the longitudinal axis of the mower M.

The axle housing 60 comprises a pair of frame rails 62, 63, which support suspension cages 65 at the respective remote ends of the rear axle housing. Each suspension cage comprises a "U" shaped framework having parallel side plates 67 joined by a cross member 69. Each of the suspension cages 65 supports a wheel assembly 72 and, in keeping with the objectives of the invention, are articulated about a pivot pin 74 in a plane transverse to the plane of the rear axle housing 60. The pivot pin 74 is secured in apertures 76 in the frame rails 62. Companion apertures 78 align with the apertures 76 to receive the pivot pins 74 which then permit the movement thereabout.

Movement of the wheel assemblies is limited, and vibration is dampened by the provision of damping pillows 81 which are secured between the axle housing 60 and the cages 65. For this purpose, the frame rails 62, 63 are provided with flanges 83 extending outwardly from each rail. Companion flanges are provided on each of the side plates 67, a flange on a frame rail being vertically aligned with a similar flange on a side plate. As seen in FIG. 8, pillows 81 are positioned between such flanges and a bolt 85 passes through the longitudinal axis of each pillow and is secured in apertures in the aligned flanges to thereby hold the pillow between them. The pillow is sized to abut the flanges above and beneath each, where it is held in place by bolts, and the pillow is compressed by the rapid upward movement of a wheel assembly, thereby dampening that movement and inhibiting, or at least modulating, transmission of that movement to the frame of the mower. The rapid movement resulting from the traversing of rocks and other debris is particularly well dampened. Moreover, if the wheel were to move downwardly, in a pot hole for example, it is inhibited from moving too rapidly or too far from its unstressed position.

The construction of the pillows 81 is substantially the same as described in some detail relative to the pillows 52 used in the forward suspension, with the exception that the hardness may vary as a result of the additional weight that is experienced by the placement of the engine at the rear of the mower.

It will be appreciated, particularly by those skilled in the art, that minor differences in the structure described may be adopted, without a material change in the function or operation of the mower, or departure from the invention as described in the accompanying claims, wherein:

The invention claimed is:

1. A riding mower having a frame, a mower deck supported beneath the frame, a chair on said frame and a source of motive power also supported on said frame;
    said frame supported on forward and rear independent wheel assemblies, said wheel assemblies each supporting a wheel; and a vibration damping system interposed between said frame and each of said forward and rear wheel assemblies, said frame including a rear axle housing mounted transverse to the longitudinal axis of said frame and including parallel frame rails, said frame rails supporting said rear wheel assemblies;
    said vibration damping system comprising at least one elastomeric pillow interposed between said frame and each said forward and rear wheel assembly, said elastomeric pillow being of a resilient material for absorbing shock and vibration resulting from a wheel contacting irregularities in the terrain traversed thereby and said elastomeric pillow held in place by a fastener adapted to limit movement of said wheel assembly.

2. The riding mower of claim 1, wherein said forward wheel assemblies caster in response to vehicle movement.

3. The riding mower of claim 1, wherein said pillow is disposed on either side of each said wheel.

4. The riding mower of claim 1, wherein said rear wheel assemblies include a suspension cage, said suspension cage being pivoted relative to said frame, and pillows supporting said cage.

5. A riding mower having a frame, a mower deck supported beneath the frame, a chair on said frame and a source of motive power also supported on said frame;
    said frame supported on forward and rear independent wheel assemblies, said wheel assemblies each supporting a wheel and said forward wheel assemblies castering in response to vehicle movement and said rear wheel assemblies include a suspension cage, said suspension cage being pivoted relative to said frame; and a vibration damping system interposed between said frame and each of said forward and rear wheel assemblies, said frame including a rear axle housing mounted transverse to the longitudinal axis of said frame and including parallel frame rails, said frame rails supporting said rear wheel assemblies;
    said vibration damping system comprising an elastomeric pillow interposed between said frame and each said forward and rear wheel assembly and on either side of each said wheel, each of said elastomeric pillows being of a resilient material for absorbing shock and vibration resulting from a wheel contacting irregularities in the terrain traversed thereby and each of said elastomeric pillows held in place by a fastener adapted to limit movement of said wheel assembly.

\* \* \* \* \*